United States Patent [19]

Kehr et al.

[11] 3,898,349

[45] Aug. 5, 1975

[54] POLYENE/POLYTHIOL PAINT VEHICLE

[75] Inventors: Clifton L. Kehr, Silver Spring; Walter R. Wszolek, Sykesville, both of Md.

[73] Assignee: W. R. Grace & Co., New York, N.Y.

[22] Filed: July 1, 1974

[21] Appl. No.: 484,535

Related U.S. Application Data

[63] Continuation of Ser. No. 65,725, Aug. 20, 1970, abandoned, which is a continuation-in-part of Ser. Nos. 44,607, June 8, 1970, Pat. No. 3,661,744, and Ser. No. 49,207, June 23, 1970, Pat. No. 3,662,023, and Ser. No. 49,191, June 23, 1970, Pat. No. 3,708,413, which is a continuation-in-part of Ser. No. 617,801, Feb. 23, 1967, abandoned, which is a continuation-in-part of Ser. No. 567,841, July 26, 1966, abandoned.

[52] U.S. Cl. .................. 427/36; 427/44; 427/53; 427/54; 427/136

[51] Int. Cl.² ........................................... B44D 1/50

[58] Field of Search ......... 260/79, 79.5 L; 117/62.2, 117/93.3, 93.31, 161 R, 161 UD; 204/159.18; 427/36, 44, 53, 54, 136

[56] References Cited
UNITED STATES PATENTS

| | | | |
|---|---|---|---|
| 2,767,156 | 10/1956 | Tawney | 260/41.5 |
| 3,240,844 | 3/1966 | Gruver | 260/79.5 C |
| 3,278,352 | 10/1966 | Erickson | 260/79 |
| 3,338,810 | 8/1967 | Warner | 204/159.18 |
| 3,371,072 | 2/1968 | Signounet | 260/79 |
| 3,405,181 | 10/1968 | Gounden | 260/79 |
| 3,412,049 | 11/1968 | Gmitter | 260/79 |
| 3,578,614 | 5/1971 | Wszolek | 117/122 PA |

*Primary Examiner*—Michael Sofocleous
*Attorney, Agent, or Firm*—Richard P. Plunkett; Kenneth E. Prince

[57] ABSTRACT

A paint vehicle is prepared from a composition comprising (1) about 98 to 2% by weight of a liquid polyene containing at least terminal 2 reactive unsaturated carbon to carbon bonds per molecule and (2) about 2 to 98% by weight of a polythiol containing at least two thiol groups per molecule, the total combined functionality of (a) the reactive unsaturated carbon to carbon bonds per molecule in the polyene and (b) the thiol groups per molecule in the polythiol being greater than 4, which composition is curable, preferably under ambient conditions, in the presence of a free radical generator such as electromagnetic radiation of wave-length of about 2000–7000 A or high energy ionizing radiation. In instances where the free radical generator is electro-magnetic radiation, a curing rate accelerator in an amount ranging from 0.0005 to 50% by weight of said composition is added to the polyene/polythiol composition. The resultant vehicle, in pigmented form, can be used per se as a solventless paint or can be used with an inert organic solvent or as a water-soluble or water-dispersible paint.

11 Claims, No Drawings

POLYENE/POLYTHIOL PAINT VEHICLE

This is a continuation of application Ser. No. 65,725 filed Aug. 20, 1970, now abandoned.

Which in turn is a continuation in part of our copending applications having serial nos. 44,607 filed June 8, 1970 and now U.S. Pat. No. 3,661,744; 49,207 filed June 23, 1970 and now U.S. Pat. No. 3,662,023 and 49,191 filed June 23, 1970 and now U.S. Pat. No. 3,708,413; which in turn are continuations in part of our application having Ser. No. 617,801 filed Feb. 23, 1967 and now abandoned which in turn is a continuation in part of our application having Ser. No. 567,841 filed July 26, 1966 and now abandoned.

The present invention relates to an improved paint vehicle. More particularly the instant invention is directed to a novel paint vehicle which is curable preferably under ambient conditions in the presence of a free radical generator.

Recently there has been a great deal of publicity and clamor regarding the release of volatile organic solvents into the atmosphere which leads to air pollution and hazards associated therewith. In many coatings and paint applications, an organic solvent or thinner is used to reduce the viscosity of the paint vehicle so that the paint can be applied either more readily, rapidly or for economic reasons. These solvents however, lead to air pollution and it is now desired to eliminate the volatile organic components from paints.

In both the paint and industrial coating art today there is need for quick drying paints varnishes and lacquers that do not require excessive temperatures. Additionally there is a need to provide gloss or semi-gloss paints and enamels which have good covering power, good abrasive resistance, a high water and chemical resistance and which can be applied with ease both by professional and non-professional painters.

One object of the instant invention is to provide a paint vehicle which can be dried by curing at ambient temperatures. Another object of the instant invention is to provide a paint vehicle which can be dried by curing at ambient temperatures rapidly within a matter of a few seconds or minutes. Another object is to provide a paint vehicle which does not require an organic solvent or thinner. Yet another object of the instant invention is to provide a paint vehicle which can be dried by curing in the presence of a free radical generator.

The aforesaid and other objects are obtained by a paint vehicle prepared from a composition comprising (1) about 98 to 2% by weight of a liquid polyene containing at least two terminal reactive unsaturated carbon to carbon bonds per molecule and (2) about 2 to 98% by weight of a polythiol containing at least two thiol groups per molecule the total combined functionality of (a) the reactive unsaturated carbon to carbon bonds per molecule in the polyene and (b) the thiol groups per molecule in the polythiol being greater than 4, which composition is curable under ambient conditions in the presence of a free radical generator. In instances where the free radical generator is electromagnetic radiation a curing rate accelerator in an amount ranging from 0.0005 to 50% by weight of said composition is added to the polyene/polythiol composition. The resultant vehicle in pigmented form when used per se without a thinner dries by radiation curing within a matter of seconds. In instances where a thinner such as water or an organic solvent is added to the pigmented vehicle drying times are of somewhat longer duration. The resultant paints, enamels, lacquers and varnishes cure to solid coatings having good covering power, gloss, adhesiveness and a high water and chemical resistance.

The crucial ingredients in the preferred photocurable paint vehicle composition of the instant invention are:

1. about 2 to about 98 parts by weight of a polyene containing two or more terminal reactive unsaturated carbon to carbon bonds per molecule;
2. about 98 to about 2 parts by weight of a polythiol containing at least two thiol groups per molecule; and
3. about 0.0005 to about 50 parts by weight (based on 100 parts by weight of (1) and (2) of a photocuring rate accelerator.

It is to be understood, however, that when energy sources other than visible or ultraviolet light are used to initiate the curing reaction, photocuring rate accelerators (i.e., photosensitizer, etc.) generally are not required in the formulation. That is to say, the actual composition of the curable composition may vary with the type of energy source that is used to initiate the curing reaction.

The reactive carbon-to-carbon bonds of the polyenes are located terminally, near terminally, and/or pendant from the main chain. The polythiols employed, contain two or more thiol groups per molecule. The photocurable compositions are liquid (i.e., flowable) over the temperature range provided during the application.

Methods of preparing various polyenes, with the limitations set forth herein, useful within the scope of this invention are disclosed in copending application Ser. No. 674,773, filed Oct. 12, 1967 and assigned to the same assignee and now abandoned. Some of the useful polyenes are prepared in the detailed examples set forth in the following specification. The general formulas for several useful representative polyenes and polyynes are given in the Figure in Dutch (Holland) application No. 67/10439 which was laid open to public inspection and copying thereof on Jan. 29, 1968 (said pertinent portions of said public document being incorporated herein by reference).

The polythiols and one group of operable polyenes which can be cured rapidly by the practice of the instant invention are set out in a copending application assigned to the same assignee having Ser. No. 617,801 filed Feb. 23, 1967 and are incorporated herein by reference. That is, one group of polyenes operable in the instant invention are those having a molecular weight in the range of 50 to 20,000, a viscosity ranging from essentially 0 to 20 million centipoises at 70°C of the general formula: $[A\!+\!\!+\!X)_m$ wherein X is a member of the group consisting of

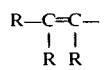

and R—C ≡ C—; m is at least 2; R is independently selected from the group consisting of hydrogen, halogen, aryl, substituted aryl, cycloalkyl, aralkyl, substituted arylkyl and alkyl and substituted alkyl groups containing 1 to 16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S, P, or O but contains primarily carbon-carbon, carbon-oxygen or silicon-oxygen containing chain linkages without any reactive carbon to carbon unsaturation.

Examples of said operable polyenes include, but are not limited to 1. crotyl-terminated polyurethanes which contain two "reactive" double bonds per average molecule in the near terminal position of the average general formula:

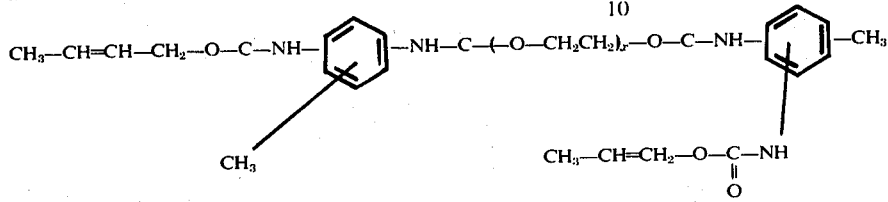

where $x$ is at least 1.

2. ethylene/propylene/non-conjugated diene terpolymers, such as "Nordel 1040" manufactured by duPont which contains pendant "reactive" double bonds of the formula: $—CH_2—CH=CH—CH_3$, 3. the following structure which contains terminal "reactive" double bonds:

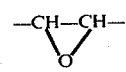

where $x$ is at least 1, 4. the following structure which contains near terminal "reactive" double bonds

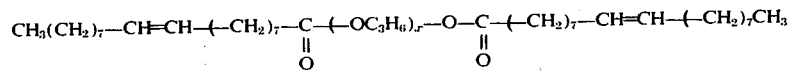

where $x$ is at least 1.

As used herein polyenes and polyynes refer to simple or complex species of alkenes or alkynes having a multiplicity of pendant on terminally positioned reactive carbon to carbon unsaturated functional groups per average molecule. For example, a diene is a polyene that has two reactive carbon to carbon double bonds per average molecule, while a diyne is a polyyne that contains in its structure two reactive carbon to carbon triple bonds per average molecule. Combinations of reactive double bonds and reactive triple bonds within the same molecule are also possible. An example of this is monovinyl acetylene, which is a polyeneyne under our definition. For purposes of brevity all these classes of compounds will be referred to herein as polyenes.

A second group of polyenes operable as part of the paint vehicle composition in this invention includes those polyenes in which the reactive unsaturated carbon to carbon bonds are conjugated with adjacent unsaturated groupings. Examples of oeprable reactive conjugated ene systems include, but are not limited to the following:

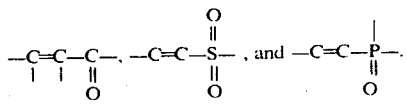

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

Another group of polyenes operable as part of the paint vehicle compositions having an -ene or -yne functionality of at least two are formed by reacting either a. An organic epoxide containing at least two $$—CH—CH—\atop\diagdown O \diagup$$

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or b. An organic epoxide containing at least one organic substituent containing a reactive ethylenically or ethynylically unsaturated group with a member of the group consisting of active hydrogen functions from the group consisting of

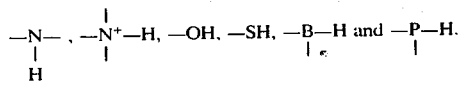

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main cahin in the molecule. The term "pendant" means that the reactive carbon to carbon unsaturation is located terminally or near terminally in a branch of the main chain as contrasted to a position at or near the ends of the main chain. For purposes of brevity all of these positions will be referred to generally as terminal unsaturation.

The liquid polyenes operable in the first group of polyenes described above in the instant invention contain one or more of the following types of non-aromatic and non-conjugated "reactive" carbon to carbon unsaturation:

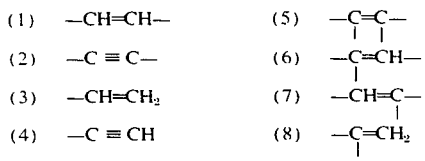

These functional groups as shown in 1–8 supra are situated in a position either which is pendant, terminal or near terminal with respect to the main chain but are free of terminal conjugation. As used herein the phrase "free of terminal conjugation" means that the terminal reactive unsaturated groupings may not be linked directly to nonreactive unsaturated species such as:

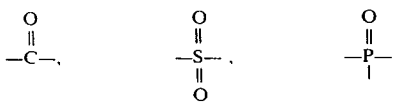

and the like so as to form a conjugated system of unsaturated bonds exemplified by the following structure:

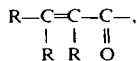

etc. On the average, the polyenes must contain 2 or more terminal reactive unsaturated carbon to carbon bonds/molecule and have a viscosity in the range from essentially 0 to 20 million centipoises at 70°C. Including in the term "polyenes" as used herein are those materials which in the presence of an inert solvent, thinner, aqueous dispersion or plasticizer fall within the viscosity range set out above at 70°C. Operable polyenes in the instant invention have molecular weights in the range 50–20,000, preferably 500 to 10,000.

As used herein the term reactive unsaturated carbon to carbon groups means groups having the structure as shown in 1–8 supra which will react under proper conditions as set forth herein with thiol groups to yield the thioether linkage

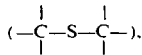

as contrasted to the term unreactive carbon to carbon unsaturation which means

groups when found in aromatic nucleii (cyclic structures exemplified by benzene, pyridine, anthracene, and the like) which do not under the same conditions react with thiols to give thioether linkages. In the instant invention, cured paint, enamel, varnish or lacquer coatings from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of essentially 0 to 20 million centipoises (cps) at 70°C as measured by a Brookfield Viscometer. Included in the term "polythiols" as used herein are those materials which in the presence of an inert solvent, thinner, aqueous dispersion or plasticizer fall within the viscosity range set out above at 70°C. Operable polythiols in the instant invention usually have molecular weights in the range 50–20,000 preferably 100–10,000.

The polythiols operable in the instant invention can be exemplified by the general formula: $R_8\text{―}(\text{―SH})_n$ where n is at least 2 and $R_8$ is a polyvalent organic moiety. Thus $R_8$ may contain cyclic groupings and minor amounts of hetero atoms such as N, S, P or O but primarily contains carbon - carbon, carbon-hydrogen, carbon-oxygen, or silicon-oxygen containing chain linkages.

One class of polythiols operable with polyenes in the instant invention is esters of thiol-containing acids of the general formula: $HS\text{―}R_9\text{―}COOH$ where $R_9$ is an organic moiety with polyhydroxy compounds of the general structure: $R_{10}\text{―}(\text{―OH})_n$ where $R_{10}$ is an organic moiety and $n$ is 2 or greater. These components will react under suitable conditions to give a polythiol having the general structure

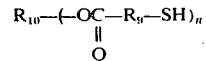

where $R_9$ and $R_{10}$ are organic moieties and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid ($HS\text{―}CH_2COOH$), α-mercaptopropionic acid ($HS\text{―}CH(CH_3)\text{―}COOH$ and β-mercaptopropionic acid ($HS\text{―}CH_2CH_2COOH$) with polyhydroxy compounds such as glycols, triols, tetraols, pentaols, hexaols, etc. Specific examples of the preferred polythiols include, but are not limited to, ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate), tris (hydroxyethyl) isocyanurate tris (β-mercaptopropionate) and pentaerythritol tetrakis (β-mercaptopropionate), most of which are commercially available. A specific examples of a preferred polymeric polythiol is polypropylene ether glycol bis (β-mercaptopropionate) which is prepared from polypropylene ether glycol (e.g., Pluracol P2010, Wyandotte Chemical Corp.) and β-mercaptopropionic acid by esterification.

The preferred polythiol compounds are characterized by a low level of mercaptan-like odor initially, and after reaction, give essentially odorless cured products which are commercially attractive and practically useful for both indoor and outdoor application.

Other operable polythiols include tris (2-hydroxyethyl) isocyanurate tris (3-mercaptopropionate); tris (2-thiocarboxyethyl) isocyanurate; tris (2-mercaptoethyl) isocyanurate; tris (2-mercaptoethoxyethyl) isocyanurate and the like.

The term functionality as used herein refers to the average number of ene or thiol groups per molecule in the polyene or polythiol, respectively. For example, a triene is a polyene with an average of three reactive carbon to carbon unsaturated groups per molecule and thus has a functionality (f) of three. A dithiol is a polythiol with an average of two thiol groups per molecule and thus has a functionality (f) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional groups, and there may be a trace of materials that would have no ene functional groups at all. Approximately 90% of the molecules, however, would have the desired diene structure and the product as a whole would then have an actual functionality of 1.9. Such a product is useful as a component of the paint vehicle of the instant invention and is referred to herein as having a functionality of 2.

The aforesaid polyenes and polythiols, can if desired, be formed or generated in situ and still be rapidly cured by the process of the instant invention.

To obtain the maximum strength, solvent resistance, creep resistance, heat resistance and freedom from tackiness, the reactive components consisting of the polyene, polythiol, pigment (in combination with a curing rate accelerator when visible or UV light is the free radical generator) and optionally a thinner are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The paint vehicle compositions to be cured, i.e., (converted to solid coatings) in accord with the present invention are ordinarily transparent or translucent but may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, mica flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide, sand and the like. The aforesaid additives may be present in quantities up to 500 parts per 100 parts of the polyene-polythiol compositions by weight and preferably 0.005–300 parts on the same basis.

The paints and enamels made from the curable paint vehicle of the instant invention can be pigmented by the use of any of the well known, commercially available pigments presently being used in commercial paints and enamels including, but certainly not limited to, carbon black, $TiO_2$, calcium carbonate, iron oxide and the like. In the instant invention, pigmentation can also be accomplished by adding a covering agent such as a calcium carbonate or barium sulfate filler in combination with an organic dye such as Azosol Black manufactured by General Aniline and Film, Linden, New Jersey. The pigments of the instant invention are added in amounts now used in commercially available paints and enamels. Specific amounts of pigment added to the composition are in the range 10 to 300% by weight preferably 40 to 150% by weight of the polyene/polythiol composition.

Various curing rate accelerators are operable when using UV or visible light to cure the paint vehicle in the instant invention. Examples of curing rate accelerators e.g., UV absorbers and sensitizers include but are not limited to benzophenone, acetophenone, acenaphthene-quinone, methyl ethyl ketone, valerophenone, hexanophenone, δ -phenylbutyrophenone, p-morpholinopropiophenone, dibenzosuberone, 4'-morpholinobenzophenone, 4-morpholinodeoxybenzoin, p-diacetylbenzene, 4-aminobenzophenone, 4'-methoxyacetophenone, benzaldehyde, α -tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthene-9-one, xanthene-9-one, 7-H-benz[de] anthracen-7-one, 1-naphthaldehyde, 4,4'-bis(dimethylamino) benzophenone, fluorene-9-one, 1'-acetonaphthone, 2'-acetonaphthone and 2,3-butanedione, dibenzosuberone, etc.

Although the preferred means of curing is by means of electromagnetic radiation of wavelength of about 2000–7000 A (because of simplicity, economy and convenience), the polyene-polythiol composition of the instant invention can be cured also by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (e.g., protons, alpha particles and deuterons and also electrons or neutrons). The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from cathode ray tubes, radioactive isotopes or an atomic pile. Gamma rays or X-rays may be obtained from radio isotopes (e.g., cobalt 60) or by particle bombardment of suitable target).

The dose rate for the irradiation operable to cure the composition in the instant invention is in the range 0.0001 to 200 megarads/second.

The amount of ionizing radiation which is employed in curing the curable paint vehicle composition in the instant invention can vary between broad limits. Radiation dosages of less than a megarad up to 10 megarads or more for electrons are operable, preferably 0.02 to 5 megarads energy absorbed are employed. For gamma-rays or X-rays, radiation dosages in the range 0.0001 to 5.0 megarads energy absorbed are operable. The irradiation step is ordinarily performed under ambient temperatures conditions but can be performed at temperatures ranging from below room temperatures up to temperatures above 200°F.

When using ionizing radiation, the depth of penetration is dependent upon the density of the material to be penetrated. When the ionizing irradiation is in the form of electrons, 0.001 to 12 million electron volts (Mev) are usually employed. Where gamma rays or X-rays are employed, a range of 0.1 to 5.0 million electron volts is used.

The curing reaction can also be initiated by any free radical mechanism which dissociates or abstracts a hydrogen atom from the SH group (or accomplishes the equivalent thereof) and which is operable preferably under ambient conditions. Thus it is possible merely to expose a pigmented polyene and polythiol paint vehicle admixture to ambient conditions (oxygen from the air is the initiator) and obtain a cured solid coating over an extended curing period. Although oxygen is preferred, other gaseous oxidizing agents such as chlorine, ozone and the like can also be used.

The compounding of the components prior to curing can be carried out in several ways. For example, the polyene, polythiol, pigment and any other additives e.g., thinner can be admixed in an inert atmosphere and charged to an oxygen free aerosol can, drum, tube, or cartridge for subsequent use.

Another useful method of compounding is to prepare in an ambient atmosphere by conventional mixing techniques but in the absence of actinic radiation a composition consisting a polyene, antioxidant (to inhibit spontaneous oxygen-initiated curing), a polythiol, a pigment, a curing rate accelerator, and other inert additives. This composition can be stored in the dark for extended periods of time, but on exposure to actinic radiation (e.g., ultraviolet light, sunlight, etc.) will cure controllably and in a very short time period to solid polythioether products.

The curing period can be retarded or accelerated so that it can vary from less than 1 minute to 30 or more days. Conventional curing initiators or accelerators operable in the instant invention include, but are not limited to oxygen; ozone; ultraviolet light (with and without coagent sensitizers); high energy radiation such as X-rays, β-rays, electron beams, gamma radiation, and the like. Conventional curing inhibitors or retarders operable in the instant invention include but are not limited to hydroquinone; p-tert-butyl catechol; 2,6-ditert-butyl-p-methylphenol; phenothiazine; N-phenyl-2-naphthylamine; inert gas atmospheres such as helium, argon, nitrogen, and carbon dioxide; vacuum; and the like.

The curable pigmented or unpigmented liquid paint vehicle of the instant invention can be formulated to be used as 100% solids (i.e., no volatile thinner) or it can be used in inert organic solvent thinners such as aliphatic or aromatic hydrocarbons e.g., cyclohexane, benzene and the like at both low and high total solids content. Additionally it can be used as dispersions or emulsions in an aqueous thinner. These thinners can be employed to improve the flow characteristics of the coating. It is also possible to use a low viscosity polyene as a reactive thinner. These polyenes when reacted with a polythiol may afford poor coating characteristics but when added as a reactive thinner and cocured with the polyene/polythiol compositions operable herein yield excellent coatings and have good flow characteristics when applied. If a thinner is added to the polyene/polythiol paint vehicle, the amount of said thinner added to the vehicle is dependent upon the type of thinner. Thus if a low viscosity polyene reactive thinner is used amounts of said thinner are in the range 10–200 weight %, preferably 10–100 weight percent based on the weight of the polyene/polythiol paint vehicle. This type of thinner becomes an actually part of the coating and is not evaporated off as the other types such as the inert hydrocarbon solvent or water.

Furthermore, since the low viscosity polyene reactive thinner is cocured, it is necessary to add sufficient additional polythiol to reactive therewith. For inert organic solvents or water, amounts in the range 20 to 700 weight % based on the polyene/polythiol paint vehicle are used. Aqueous dispersions of the polyene/polythiol are made up so as to contain about 20 to about 60% solids.

Although the aforesaid thinners can be added to the polyene/polythiol paint vehicle, it is preferred to use the polyene/polythiol paint vehicle without a solvent to take advantage of the rapid cure.

The pigmented paint vehicle of the instant invention can be applied in various ways. That is, it can be sprayed, brushed, rolled, drawn, trowelled, pumped, siphoned, doctored, dip-coated, extruded or gunned onto the surface to be coated and thereafter cured. The pigments paint vehicle can be applied to many substrates and it adheres well to glass, wood, metals, cement, concrete, macadamized surfaces, certain plastics, paints, enamels, fabrics, leather, paper, paper board, porcelain, ceramics, brick, cinder block, plaster and the like.

When used without pigments or fillers, the vehicle of the present invention are useful as varnishes or lacquers.

The thickness of the film layers from the compositions of this invention can vary over wide limits, depending on whether the application is intended for protective or decorative purposes, on the environment to which it is exposed, and the like. Thus film thicknesses of about 1 micron to 20 mils or greater may be used, but the preferred range is from about 2 microns to 10 mils. These thicknesses can be attained either in a single application or by application of multiple coats of similar or dissimilar compositions. The use of primer coats or top coats of varying structure and composition is permissible without departing from the spirit of this invention.

The molecular weight of the polyenes of the instant invention can be measured by various conventional methods including solution viscosity, osmotic pressure and gel permeation chromatography. Additionally, the molecular weight can be calculated from the known molecular weight of the reactants.

The viscosity of the polyenes and polythiols was measured on a Brookfield Viscometer at 30° or 70°C in accord with the instructions therefor.

The following examples will aid in explaining, but should not be deemed as limiting, the instant invention. In all cases, unless otherwise noted, all parts and percentages are by weight.

PREPARATION OF POLYENES

EXAMPLE 1

1 mole diglycidyl ether of Bisphenol A having a molecular weight in the range 370–384 and commercially available from Shell Chemical Company under the tradename "Epon 828" and 2 moles of diallyl amine were charged to a beaker at room temperature (25°C). The reaction was continued for 18 hours with stirring during which time the exotherm and reaction temperature was maintained below 80°C. The thus formed allyl terminated liquid prepolymer will hereinafter be referred to as Prepolymer A.

EXAMPLE 2

1 mole of a commercially available liquid polymeric diisocyanate sold under the trade name "Adiprene L 100" by E. I. duPont de Nemours & Co., was charged to a resin kettle equipped with a condenser, stirrer, thermometer and a gas inlet and outlet along with 4 grams of dibutyl tin dilaurate as a catalyst. 2 moles of allyl alcohol was slowly added to the kettle during which time the exotherm and reaction temperature was maintained below 80°C. After the addition of the allyl alcohol was completed the reaction was continued for 15 hours at 70°C under nitrogen. The thus formed allyl terminated liquid prepolymer will hereinafter be referred to as Prepolymer B.

EXAMPLE 3

1 mole of commercially available tolylene diisocyanate was charged to a resin kettle equipped with a condenser, stirrer, thermometer, and gas inlet and outlet. 2 moles of the diallyl ether of trimethlopropane was slowly added to the kettle. After the addition was complete, 4.0 grams of dibutyl tin dilaurate as a catalyst was added to the kettle and the reaction was continued for 30 minutes at 70°C under nitrogen. The thus formed allyl terminated liquid prepolymer will hereinafter be referred to as Prepolymer C.

EXAMPLE 4

1 mole of commercially available polyethylene glycol having a molecular weight of 1450 and a specific gravity of 1.21 was charged to a resin kettle maintained under nitrogen and equipped with a condenser, stirrer, thermometer and a gas inlet and outlet. 2.9 g. of dibutyl tin dilaurate as a catalyst was charged to the kettle along with 2 moles of tolylene-2,4-diisocyanate and 2 moles of allyl alcohol. The reaction was continued with stirring at 60°C for 2 hours. Thereafter a vacuum of 1 mm. was applied for 2 hours at 60°C to remove the excess alcohol. This $CH_2=CH-$ terminated prepolymer had a molecular weight of approximately 1950 and will hereinafter be referred to as Prepolymer D.

EXAMPLE 5

1 mole of a commercially available polyoxypropylene glycol having a molecular weight of about 1958 and a hydroxyl number of was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2=CH-$ terminated liquid prepolymer had a molecular weight of approximately 2400 and will hereinafter be referred to as Prepolymer E.

EXAMPLE 6

750 g. of a N-containing tetrol (hydroxyl functionality =4) available from Wyandotte Chemicals Corp. under the tradename "Tetronic Polyol 904" having a N.W. of 7.500 was placed in a reaction vessel heated at 110°C. The flask was maintained under vacuum for 1 hour. Then, under an atmosphere of nitrogen, 0.1 cc. dibutyl tin dilaurate was added and the flask was cooled to 50°C. Now 18.3 g. allyl isocyanate was added slowly, maintaining the temperature at about 95°C for about 1 hour after the addition was complete. The thus formed polymeric polyene (i.e., Prepolymer F hereinafter) had a theoretical allyl functionality of 2.2, a theoretical hydroxyl functionality of 1.8, and a calculated molecular weight of about 7,683.

EXAMPLE 7

To a 1 liter resin kettle equipped with stirrer, thermometer, gas inlet and out let and heated to a temperature of 50°C was charged 610 g. (0.2 mole) of polytetramethylene ether glycol, commercially available from Quaker Oats Co. and having a hydroxyl number of 37.1 along with 0.3 g. dibutyl tin dilaurate. The temperature of the kettle was raised to 110°C and the contents were freed of water under 1 millimeter vacuum for 1 hour. The resin kettle was cooled to 60°C and the system was placed under a protective atmosphere of nitrogen throughout the remainder of the reaction. 25.2 g. of allyl isocyanate, (0.4 mole) was added dropwise to the kettle at such a rate as to maintain the temperature at 60°C. When the NCO content dropped to 0.54 mg/g., 1 mm. vacuum again was applied and the system was heated at 70°C for one hour. The thus formed polymer product was a solid at room temperature but at 50° C is clear and pourable. The polymer product had a viscosity of 1,800 centipoises at 70°C as measured on a Brookfield Viscometer and an average molecular weight of approximately 3200 and will be referred to hereinafter as Prepolymer G.

EXAMPLE 8

To a 1 liter 4 neck flask heated at 110°C was charged 808 g. of a polyester diol (having a molecular weight 3232) sold under the tradename "RC Polyester S 101-35" by R. C. Division, Hooker Chemical Corp. and 0.1 cc. dibutyl tin dilaurate. The flask was maintained under vacuum at 110°C for 1 hour. The flask was cooled to approximately 50°C and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90°C was produced by the exothermic reaction. The polymeric product obtained was a solid at room temperature but liquid at 70°C. The product had an average molecular weight of approximately 10,500 and a viscosity of 270,000 centipoises at 70°C and will be referred to hereinafter as Prepolymer H.

EXAMPLE 9

4 moles of commercially available tolylene diisocyanate having a molecular weight of 174 were charged to a nitrogen blanketed, resin kettle equipped with stirrer, condenser, thermometer and pressure equalizing dropping funnel. The kettle was heated to 60°C with stirring during which time 8 moles (464 g.) of allyl alcohol was added through the dropping funnel while the temperature was maintained at 60°–70°C. After completing the addition of the allyl alcohol, the reaction was contained at 60°–70°C with stirring for 2 hours; sufficient additional allyl alcohol was added until the NCO content was zero. The resultant liquid allyl terminated prepolymer will hereinafter be referred to as Prepolymer J.

EXAMPLE 10

2 moles of sodium hydroxide were dissolved in 280 g water in a round bottom flask equipped with condenser and stirrer. 122 g. of methanol and 1.0 mole (228 g.) of bisphenol A having a molecular weight in the range 370–384 and commercially available from Shell Chemical Co. under the tradename "Epon 828" were added to the flask and the resultant slurry was heated to reflux (78°C). 2.0 moles (153 g.) allyl chloride was added dropwise to the flask over a 0.5 hr. period. The mixture is then heated at reflux with stirring for 4 hours. The methanol was removed by distillation. The product was transferred to a separatory funnel and the lower aqueous layer removed. The upper layer was washed 4 times with 400 g. of water (each time) to remove the sodium chloride. The resultant allyl terminated prepolymer was dried by heating in a rotary vacuum evaporator at 90°C and will be referred to hereinafter as Prepolymer K.

EXAMPLE 11

67 g. of Prepolymer A from Example 1, 33 g. of pentaerythritol tetrakis ($\beta$-mercaptopropionate) commercially available from Carlisle Chemical co. under the tradename "Q-43" and 0.5 g of benzophenone were mixed and applied as a 2 mil coating to a pine board which had been sealed by treatment with a gelatin solution. The coated board was irradiated for 10 minutes under a 275 watt sun lamp delivering 400 $\mu W/cm^2$ at the surface of the coating. The resulting cured, solid, varnish coating was clear and hard.

EXAMPLE 12

67 g. of Prepolymer A, 33 g. of "Q-43" and 100 g of anatase titatanium dioxide commercially available from E. I. DuPont under the tradename "TiPure PC" were mixed in a Brabender Plastograph at 200 rpm for 10 minutes. The mixture was heated to 70°C and applied as a 3 mil coating to a 4 inches × 6 inches × 0.2 inches cold rolled steel sheet. The sheet was irradiated with the electron beam of a 2.0 Mev Van de Graaff generator with 2.0 megarads at 1.0 megarad per pass. The resulting solid paint coating was hard and tack free. The example was repeated on aluminum and on tin plated steel with similar results.

EXAMPLE 13

Example 12 was repeated using a bank of four 24 inch GE ultraviolet lamps Model H 2473 placed 5 cm above the coating, which also contained 0.5 g. dibenzosuberone. The paint composition cured in less than 5 seconds.

EXAMPLE 14

67 g. of Prepolymer A, 33 g. of "Q-43", 0.5 g. of benzophenone and 100 g. of "TiPure PC" pigment were mixed on a Brabender Plastograph at 200 rpm for 10 minutes. The master batch was diluted to make up $TiO_2$ concentrations of less than 50% by the addition of Prepolymer A. "Q-43" polythiol and benzophenone in the same weight ratios as stated supra in the example. A 1.5 mil draw down of each pigmented sample (heated to 70°C) was made on 4.5 mil thick "Mylar" polyester film. The paint coating was then exposed to a 275 watt sun lamp at 4000 $\mu w/cm^2$ through the Mylar for 3 minutes. When the uncured coating was removed by several toluene rinses, the remaining cured thickness was measured by a micrometer. The following results were obtained:

| wt. % $TiO_2$ | Thickness (mils) |
|---|---|
| 5 | 1.3 |
| 15 | 1.1 |
| 30 | 0.6 |
| 50 | 0.5 |

EXAMPLE 15

82 g. of Prepolymer B from Example 2, 18 g. of "Q-43" polythiol and 100 g. of $TiO_2$ were mixed and coated onto a 4 inches × 6 inches × 0.2 inch aluminum sheet to a thickness of 7 mils. The sheet was irradiated with an electron beam at 2.0 megarads as in Example 12. The resulting paint coating cured to a solid, tack free but flexible condition.

EXAMPLE 16

Example 15 was repeated except that the pigmented paint vehicle consisted of 55 g. of Prepolymer C from Example 3, 45 g. of "Q-43" polythiol, 0.2 g. "Irganox 1076" (a dodecyl ester of 4 hydroxy 3,5-di-t-butyl phenyl propionic acid, an oxidation stabilizer commercially available from Geigy Chemical Co.) and 100 g. of anatase. titanium dioxide commercially available E. I. DuPont under the tradename "TiPure PC". The resultant paint coating was tack free but flexible.

EXAMPLE 17

89 g. of Prepolymer D from Example 4, 11 g. of "Q-43" polythiol and 33 g. of $TiO_2$ i.e., "TiPure" pigment was mixed together in a Barbender Plastograph at 200 rpm for 10 minutes. A 1.5 mil drawdown of the admixed sample (heating to 70°C) was made on a 4 inches × 6 inches × 0.2 inch aluminum sheet and allowed to air-cure. After 24 hours, the resultant cured solid paint coating was flexible and tack free.

EXAMPLE 18

90.8 g. of Prepolymer E from Example 5, 9.2 g. of

"Q-43" polythiol were admixed in a Brabender Plastograph for 19 minutes. A 20 mil coating of the admixed paint vehicle was brushed on a 2 mil thick aluminum sheet and irradiated with a 272 watt sun lamp delivering 4000 $\mu$W/cm$^2$ at the surface of the coating for 5 minutes. The resultant cured protective lacquer coating was tack free.

EXAMPLE 19

96.6 g. of Prepolymer F from Example 6, 3.4 g. of "Q-43" and 0.5 g. of benzophenone were admixed in a Brabender Plastograph for 10 minutes. A 2 mil coating of the admixed paint vehicle was brushed on a 20 mil thick steel sheet and irradiated with a 275 watt sun lamp delivering 4000 $\mu$W/cm$^2$ at the surface of the varnish coating for 5 minutes. The resultant cured varnish coating was tack free.

EXAMPLE 20

92.9 g. of Prepolymer G from Example 7, 7.1 g. of "Q-43" and 0.5 g. of benzophenone were mixed with heating to 70°C. A 2 mil coating of the admixed paint vehicle was brushed on a 2 mil thick alumimum sheet and irradiated with a 275 watt sun lamp for 5 minutes. The resultant cured lacquer coating was tack free.

EXAMPLE 21

97.7 g. of Prepolymer H from Example 8, 2.3 g. of "Q-43" and 0.5 g. of benzophenone were mixed with heating to 70°C. A 2 mil coating of the admixed paint vehicle was brushed on a 2 mil thick aluminum sheet and irradiated with a 275 watt sun lamp delivering 4000 $\mu$W/cm$^2$ at the coating surface for 5 minutes. The resultant cured lacquer coating was tack free.

EXAMPLE 22

49.5 g. of Prepolymer J from Example 9, 50.5 g. of "Q-43" polythiol, 0.5 g. of benzophenone and 0.2 g. of "Irganox 1076" were admixed to give a fluid mixture. The mixture was applied to a 2 mil thick aluminum sheet as a coating having a thickness of 2–3 jils. The coating was irradiated with a 275 watt sun lamp for 5 minutes to give a hard solvent resistant lacquer coating cured through its entire thickness.

EXAMPLE 23

55.8 g. of Prepolymer K from Example 10, 44.2 g. of "Q-43" polythiol, 0.5 g. benzophenone, 0.2 g. "Irganox 1076" and 100 g. TiO$_2$ were admixed to give a fluid mixture. The mixture was applied to a 2 mil thick aluminum sheet as a coating having a thickness of 2–3 mils. The coating was irradiated with a 275 watt sun lamp delivering 4000 $\mu$W/cm$^2$ at the coating surface for 10 minutes to give a tack free paint coating cured through its entire thickness.

Although the polyene/polythiol paint vehicle of the instant invention is preferably used in a solventless state, it can also be used with inert organic solvents such as aliphatic or aromatic hydrocarbons e.g., cyclohexane benzene etc. or as an aqueous solution or emulsion to improve the flow characteristics of the coating. The following example shows the operability of the polyene/polythiol paint vehicle when used in the form of a water dispersion.

EXAMPLE 24

89 g. of Prepolymer D from Example 4, 11g. of "Q-43" polythiol and 0.5 g. benzophenone were admixed, heated to 70°C and poured into 300 cc. of water at 70°C with high speed agitation to form a water dispersion. A two mil coating of the water dispersion was drawn on a two mil thick aluminum sheet and the sheet was subjected to heat for a time sufficient to drive off the water. The coating was then exposed to a owatt sun lamp at 4000 $\mu$W/cm$^2$ surface intensity at the coating for a period of 5 minutes. The resultant, cured, varnish coating was tack free and had a high gloss.

EXAMPLES 25 and 26

Examples 22 was repeated except that Prepolymer J was replaced by an equivalent quantity of diallyl phthalate and triallyl isocyanurate, respectively. In this instance the photocurable compositions were applied to the substrate using a solid rubber roller, and the resultant film was approximately 5 microns in thickness. The resultant cured lacquer coatings were hard and free of tackiness.

EXAMPLE 27

110 g. of Prepolymer C from Example 3 and 100 g. of "Q-43" polythiol were admixed and packaged in a sealed metal container under conditions where rigid exclusion of air (oxygen) were employed. Both liquids were outgassed with pure nitrogen gas, and the container was flushed with nitrogen before it was sealed. When ready for use, the can was opened and applied to a ⅜inch ply wood surface by use of a conventional paint sprayer. Within two hours after application, the clear varnish coating had cured by oxygen initiation to a tack free surface. After 24 hours, the cured varnish coating was hard and durable through its entire thickness of about 1–2 mils.

EXAMPLE 28

Example 11 was repeated except that Prepolymer A was replaced by the stoichiometric amount necessary to react with the polythiol, of poly(ethylene ether) glycol diacrylate having a molecular weight of approximately 310. The resulting cured, solid varnish coating was clear and hard.

EXAMPLE 29

Example 11 was repated except that Prepolymer A was replaced by the stoichiometric amount necessary to react with the polythiol, of poly(ethylene ether) glycol dimethylacrulate having a molecular weight of approximately 339. The resulting cured, solid varnish coating was clear and hard.

EXAMPLE 30

Example 11 was repeated except that Prepolymer A was replaced by the stoichiometric amount necessary to react with the polythiol, of trimethylol propane triacrylate. The resulting cured, solid varnish coating was clear and hard.

EXAMPLE 31

Example 11 was repeated escept that Prepolymer A was replaced by the stoichiometric amount necessary to react with the polythiol, of diethylene glycol dimethacrylate. The resulting cured, solid varnish coating was clear and hard.

EXAMPLE 32

Example 12 was repeated except that Prepolymer A was replaced by the stoichiometric amount necessary to react with the polythiol, of poly(ethylene ether) glycol diacrylate having a molecular weight of approximately 310. The resulting solid, paint coating was hard and tack free on the aluminum, tin plated steel and cold rolled steel sheet substrates.

EXAMPLE 33

Example 12 was repeated except that Prepolymer A was replaced by the stoichiometric amount necessary to react with the polythiol, of poly(ethylene ether) glycol dimethylacrylate having a molecular weight of approximately 338. The resulting solid, paint coating was hard and tack free on the aluminum, tin-plated steel and cold rolled steel sheet substrates.

EXAMPLE 34

Example 12 was repeated except that Prepolymer A was replaced by the stoichiometric amount necessary to react with the polythiol, of trimethylol propane triacrylte. The triacrylate. solid, plant coating was hard and tack free on the aluminum, tin-plated steel and cold rolled steel sheet substrates.

EXAMPLE 25

Example 12 was repeated except the Prepolymer A was replaced by the stoichometric amount necessary to react with the polythiol, of diethylene glycol dimethacrylate. The resulting solid, paint coating was hard and tack free on the aluminum mtin-plated steel and cold rolled steel sheet substrates.

As aforestated the reactive carbon to carbon bonds of the polyenes are located terminally and or pendant from the main chain. The reason for this is that curing of internrally unsaturated polymers such as polybutadiene or polyisopropane results in cured products which are unstable to thermal oxidation, UV catalyzed oxidation and are subject to rapid attack by ozone due to their residual internal unsaturation after curing. Eventually, this results in degradation and embrittlement in the internal double bond polymers, substantially reducing their useful service life. This is not the case with the terminally or pendant unsaturated polyenes of the instant invention. For purposes of brevity the location of the reactive carbon to carbon bonds of the polyenes used herein are referred to herein as in the terminal position.

What is claimed is:

1. The process of coating a substrate which comprises applying to a substrate s curable composition consisting essentially of:
   1. about 98 to 2 percent by weight of a liquid polyene containing nat least 2 terminal reactive unsaturated carbon to carbon bonds per molecule of the general formula: $[A\!\!+\!\!-\!\!+X)_m$ wherein X is a member of the group consisting of

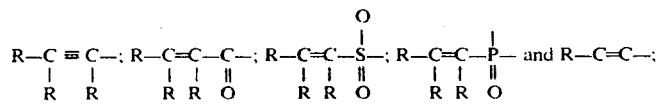

is at least 2; R is independently selected from the group consisting of hydrogen, halogen, aryl, substituted aryl, cycloalkyl, aralkyl, substituted aralkyl and alkyl and substituted alkyl group containing 1–16 carbon atoms and A is a polyvalent organic moiety free of reactive carbon to carbon unsaturation, and
   2. about 2 to 98 percent by weight of a polythiol containing at least 2 thiol groups per molecule, the total combined functionality of (a) the reactive terminal unsaturated carbon to carbon bonds per molecule in the polyene and (b) the thiol groups per molecule in the polythiol being greater than 4, and exposing said curable composition under ambient conditions to a free radical generator to form a solidified, cured polythioether coating having a thickness ranging from 1 micron to 20 mils adhering to said substrate.

2. The process according to claim 1 wherein said curable composition contains 10 to 300% by weight of said curable compositon of a pigment.

3. Process according to claim 1 wherein the curable compositijon contains 0.0005 to 50% by weight of said curable composition of a curing rate accelerator and the free radical generator is electromagnetic radiation having a wave-length ranging from 2000 to 7000 A.

4. The process according to claim 1 wherein the free radical generator is high energy ionizing radiation.

5. Process according to claim 2 wherein the curable composition contains 0.0005 to 50% by weight of said curable composition of a curing rate accelerator and the free radical generator is electromagnetic radiation having a wave-length ranging from 2000–7000 A.

6. The process according to claim 2 wherein the free radical generator is high energy ionizing radiation.

7. The process according to claim 1 wherein 20 to 700 weight percent based on the weight of the curable composition of a thinner selected from the group consisting of aliphatic hydrocarbons, aromatic hydrocarbons and water is added to the curable composition prior to applying said composition to a substrate.

8. The process according to claim 2 wherein 20 to 700 weight percent based on the weight of the curable composition of a thinner selected from the group consisting of aliphatic hydrocarbons, aromatic hyrocarbons and water is added to the curable composition prior to applying said composition to a substate 9. The process according claim 3 independerly 20 to 700 weight percent based on the weight of tl curable composition of thinner selected from the group consisting of aliphatic hydrocarbons, aromatic hydrocarbons and water is added to the curable coraposition prior to applying said composition to a substrate.

10. The process according to claim 4 wherein 20 to 700 weight percent based on the weight of the curable compositjion of a thinner selected from the group consisting of aliphatic hydrocarbons, aromatic hydrocarbons and water is added to the curable composition prior to applying said composition to a substrate.

11. The process according to claim 1 wherein said curable composition is contained in an aqueous medium and contains about 20 to about 60% solids.

UNITED STATES PATENT OFFICE
CERTIFICATE OF CORRECTION

PATENT NO. : 3,898,349
DATED : August 5, 1975
INVENTOR(S) : Clifton L. Kehr and Walter R. Wszolek It is certified that error appears in the above-identified patent and that said Letters Patent are hereby corrected as shown below:

In Column 17, Claim 1, line 52:

delete the letter "s" and add the letter --a--.

In Column 17, Claim 1, lines 60-64:

delete $$"R-C\equiv C-;\ R-C=C-C-;\ R-C=C-\overset{O}{\underset{\|}{S}}-;\ R-C=C-\overset{}{\underset{}{P}}-\ \text{and}\ R-C=C-;"$$
(with R R / R R O / R R O / R R O subscripts)

add $$--R-C=C-;\ R-C=C-C-;\ R-C=C-\overset{O}{\underset{\|}{S}}-;\ R-C=C-\overset{}{\underset{}{P}}-\ \text{and}\ R-C\equiv C-;\ m--$$
(with R R / R R O / R R O / R R O subscripts)

Signed and Sealed this eleventh Day of November 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,898,349
DATED : August 5, 1975
INVENTOR(S) : Clifton L. Kehr and Walter R. Wszolek It is certified that error appears in the above-identified patent and that said Letters Patent are hereby corrected as shown below:

In Column 18, Claim 9, line 45:

Add the word --to-- before the word "claim",

Delete the word "independently" and add the word --wherein--

Signed and Sealed this

[SEAL]

tenth Day of February 1976

Attest:

RUTH C. MASON
*Attesting Officer*

C. MARSHALL DANN
*Commissioner of Patents and Trademarks*